(12) United States Patent
Schuba et al.

(10) Patent No.: US 6,944,663 B2
(45) Date of Patent: Sep. 13, 2005

(54) METHOD AND APPARATUS FOR USING CLIENT PUZZLES TO PROTECT AGAINST DENIAL-OF-SERVICE ATTACKS

(75) Inventors: Christoph L. Schuba, Sandhausen (DE); Erik Guttman, Waibstadt (DE)

(73) Assignee: Sun Microsystems, Inc., Santa Clara, CA (US)

(*) Notice: Subject to any disclaimer, the term of this patent is extended or adjusted under 35 U.S.C. 154(b) by 727 days.

(21) Appl. No.: 10/091,826

(22) Filed: Mar. 6, 2002

(65) Prior Publication Data

US 2003/0172159 A1 Sep. 11, 2003

(51) Int. Cl.[7] .................... G06F 15/173; G06F 13/30
(52) U.S. Cl. .................... 709/225; 709/227; 713/201
(58) Field of Search ........................ 709/225, 227; 713/200, 201, 202

(56) References Cited

U.S. PATENT DOCUMENTS

| | | | | |
|---|---|---|---|---|
| 5,826,014 A | * | 10/1998 | Coley et al. ............... | 713/201 |
| 6,738,814 B1 | * | 5/2004 | Cox et al. .................. | 709/225 |
| 6,751,668 B1 | * | 6/2004 | Lin et al. ................... | 709/227 |
| 6,772,334 B1 | * | 8/2004 | Glawitsch .................. | 713/153 |
| 6,775,704 B1 | * | 8/2004 | Watson et al. ............. | 709/229 |
| 6,789,203 B1 | * | 9/2004 | Belissent ................... | 713/201 |
| 6,823,387 B1 | * | 11/2004 | Srinivas ..................... | 709/227 |
| 6,851,062 B2 | * | 2/2005 | Hartmann et al. ......... | 713/201 |

OTHER PUBLICATIONS

Publication entitled "Using Client Puzzles to Protect TLS," by Drew Dean and Adam Stublefield, proceedings of the 10th Usenic Security Symposium, Washington, D.C., USA, pp. 1–8, Aug. 2001.

* cited by examiner

*Primary Examiner*—Krisna Lim
(74) *Attorney, Agent, or Firm*—Park, Vaughan & Fleming, LLP

(57) ABSTRACT

One embodiment of the present invention provides a system that protects a server against denial-of-service attacks. During operation, the server receives a request for service from a client. Note that the client can be distinguished from other clients, for example, by its source IP address. In response to this request, the server sends a random number, y, and an identifier, $id_1$, to the client, and allows the client to compute a preimage, x, such that $y=h(x)$. Upon receiving an answer from the client including the preimage x and an identifier, $id_2$, the server verifies that the identifier, $id_1$, sent to the client matches the identifier, $id_2$, received from the client. If the identifiers match, the server computes h(x), and compares h(x) against y. If h(x)=y, the server performs the requested service for the client. In this way, the server avoids computing h(x) until the server receives the answer with a matching identifier.

30 Claims, 1 Drawing Sheet

METHOD AND APPARATUS FOR USING CLIENT PUZZLES TO PROTECT AGAINST DENIAL-OF-SERVICE ATTACKS

BACKGROUND

1. Field of the Invention

The present invention relates to providing security in distributed computing systems. More specifically, the present invention relates to a method and an apparatus for using client puzzles to protect against denial-of-service attacks.

2. Related Art

The open architecture of the Internet is instrumental in facilitating rapid dissemination of information. By making information available on a single web site, it becomes instantly accessible from millions of geographically distributed computer systems. Unfortunately, the open architecture of the Internet also makes computer systems vulnerable to attacks launched from any of the millions of computer systems coupled to the Internet.

One common type of attack is a "denial-of-service" attack, in which a large number of spurious requests for service are sent from one or more malicious client computer systems to a server computer system. For example, by sending a large number of spurious requests to a web server, the web server can become so overwhelmed that it is unable to service legitimate requests from non-malicious computer systems. Hence, the web server is effectively rendered inoperative.

One method for protecting against denial-of-service attacks is to use "client puzzles" as is described in "Using Client Puzzles to Protect TLS", by Drew Dean and Adam Stubblefield, Proceedings of the $10^{th}$ Usenix Security Symposium, Washington, D.C, U.S.A, pp.1–8, August 2001. The idea behind client puzzles is to force a client computing system to perform a significant amount of computational work before the server will process a request for the client. This makes it harder for a client to overwhelm a server with spurious requests, because in order to do so the client must perform a significant amount of computational work to cause the server to process the spurious requests.

For example, upon receiving a request for service from the client, the server can select a random number x and compute a hash value h(x). Assume the entropy of h(x) is N bits (e.g., N=128 for MD5). The server also decides how difficult is should be for the client to solve the puzzle. For example, it may choose a difficulty of a space of n=40 bits of entropy to be searched by brute force.

The server then sends the a message (id, N, x', h(x)) to the client, wherein x' is a prefix of length N-n (e.g., 28–40=88 bits) and id is a transaction identifier. The server also stores (id, h(x)).

The client then searches for the remaining n bits, say x", of h(x), such that h(x'|x")=h(x), wherein the pipe symbol "|" represents the bit string concatenation operation. The amount of work the client has to do is $O(2^{(n-1)})$.

Unfortunately, using this technique the server must still perform some processing (namely calculating h(x)) before it can send the puzzle to the client. This somewhat defeats the purpose of client puzzles, which is to minimize the amount of computational effort that the server needs to exert initially. Moreover, the server uses additional memory space to store the value h(x).

What is needed is a method and an apparatus that facilitates use of client puzzles without requiring the server to perform a significant amount of processing to formulate puzzles, and without using a significant amount of additional memory space.

SUMMARY

One embodiment of the present invention provides a system that protects a server against denial-of-service attacks. During operation, the server receives a request for service from a client. Note that the client can be distinguished from other clients, for example, by its source IP address. In response to this request, the server sends a random number, y, and an identifier, $id_1$, to the client, and allows the client to compute a preimage, x, such that y=h(x). Upon receiving an answer from the client including the preimage x and an identifier, $id_2$, the server verifies that the identifier, $id_1$, sent to the client matches the identifier, $id_2$, received from the client. If the identifiers match, the server computes h(x), and compares h(x) against y. If h(x)=y, the server performs the requested service for the client. In this way, the server avoids computing h(x) until the server receives the answer with a matching identifier.

In a variation on this embodiment, the server sends a parameter, n, along with the random number y to the client, wherein the parameter n varies the amount of computational work involved in computing the preimage x. In a further variation, the parameter n specifies that a specific subset of n bits, for example the first n bits of h(x), has to match a corresponding subset of n bits of y.

Note that if computing the preimage, x, takes more computational effort than computing h(x), the client is forced to perform more computational work than the server before the server performs the requested service.

In a variation on this embodiment, if y≠h(x), the server ignores subsequent communications from the client, distinguished from other clients, as by its source IP address.

In a variation on this embodiment, if y≠h(x), the server becomes slower in responding to subsequent communications from the client, distinguished from other clients, as by its source IP address. This can be accomplished by doubling the service time for the client each time the server determines y≠h(x). In this way, that the server spends progressively less time servicing requests for the distinguished client.

In a variation on this embodiment, the identifier, $id_1$, is inferred from data related to the communication. For example, given a TCP connection between a client process and a server process, one can identify the connection by using the 5-tuple (TCP, IP src address, IP dst address, IP src port#, IP dst port#). This saves on the work and the storage space involved in creating and storing identifiers.

In a variation on this embodiment, sending the random number y and the identifier $id_1$ to the client involves first, generating the random number y and the identifier $id_1$, and storing the random number y and the identifier $id_1$ at the server. Moreover, verifying that $id_1$ matches $id_2$ involves first looking up $id_1$ and the random number y at the server.

In a variation on this embodiment, h(x) is a hash function.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
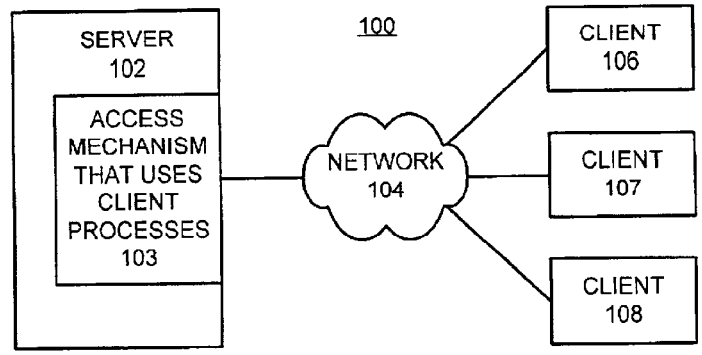
FIG. 1 illustrates a distributed computing system in accordance with an embodiment of the present invention.

FIG. 1 illustrates a distributed computing system 100, including a server 102 that communicates with a number of clients 106–108 in accordance with an embodiment of the present invention. This communication takes place through network 104. Network 104 can generally include any type of wire or wireless communication channel capable of coupling together computing nodes. This includes, but is not limited to, a local area network, a wide area network, or a combination of networks. In one embodiment of the present invention, network 104 includes the Internet.

Server 102 and clients 106–108 can generally include any type of computer system, including, but not limited to, a computer system based on a microprocessor, a mainframe computer, a digital signal processor, a portable computing device, a personal organizer, a device controller, and a computational engine within an appliance. Moreover, clients 106–108 include a mechanism for communicating across network 104, and server 102 includes a mechanism for servicing requests from clients 106–108 for computational and/or data storage resources. Server 102 also includes an access mechanism 103 that uses client puzzles to protect server 102 against denial of service attacks. The operation of access mechanism 103 is described below with reference to FIG. 2.

Note that the client and server processes can also execute on the same physical machine.

Process of Using Client Puzzles

Figure 2:
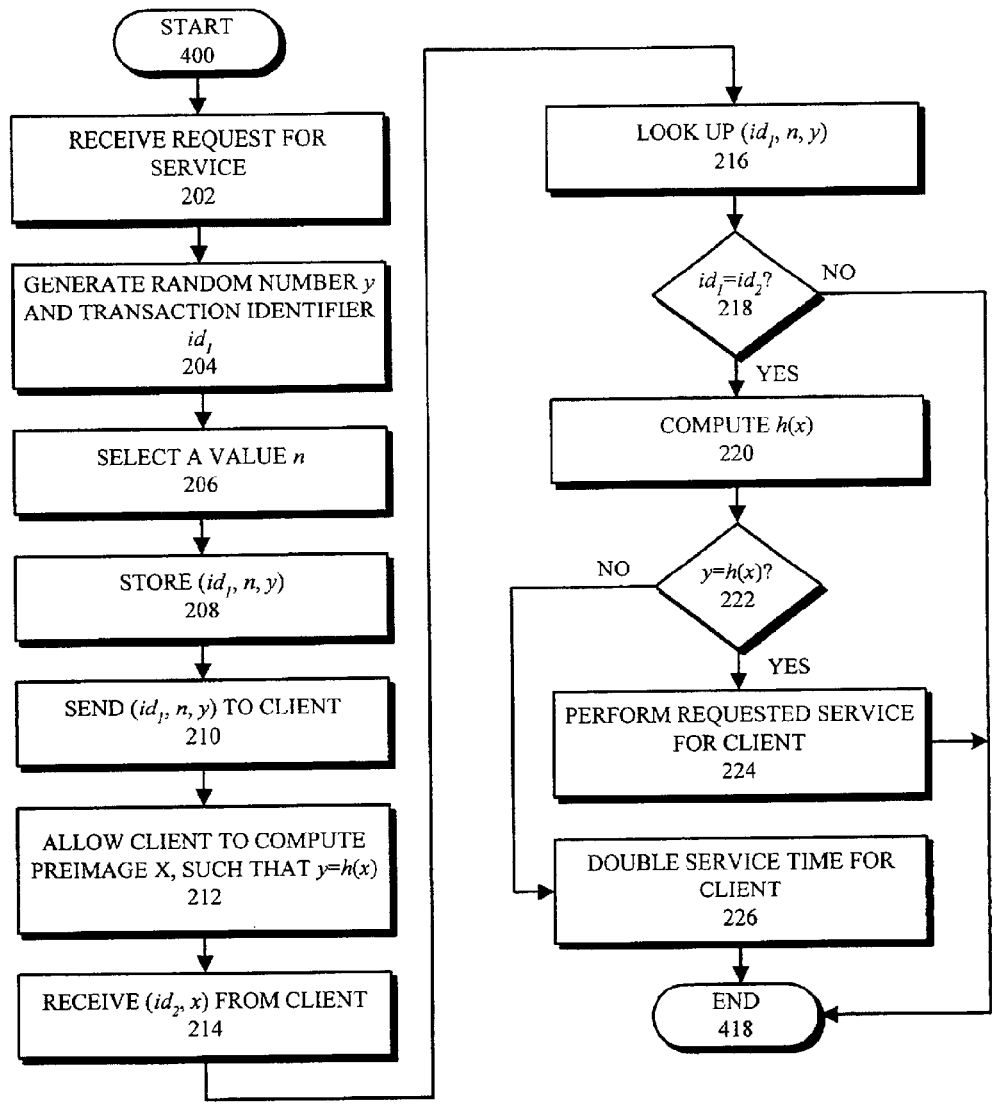
FIG. 2 is a flow chart illustrating the process of using a client puzzle in accordance with an embodiment of the present invention.

FIG. 2 is a flow chart illustrating the process of using a client puzzle in accordance with an embodiment of the present invention. During operation, the system receives a request for service from a client 106 (step 202). In response to this request, the system generates a random number, y, and a transaction identifier, $id_1$ (step 204). The system also selects a value for the parameter, n, which specifies the amount of computational work involved in computing the preimage x, such that h(x)=y (step 206).

Next, the system stores ($id_1$, n, y) at server 102 (step 208) and sends ($id_1$, n, y) to client 106 (step 210).

The system then allows client 106 to compute the preimage x, such that h(x)=y (step 212). In one embodiment of the present invention, h is a hash function, such as SHA1 or MD5, so that computing the preimage x given y requires significantly more time than computing the hash function h(x) given x. However, in general any function y=h(x) for which computing the preimage x given y requires significantly more work than computing h(x) given x can be used by the present invention.

The parameter n is used to adjust the amount of work required to compute the preimage x. For example, the parameter n can be used as a parameter to the hash function h, which indicates both the size of the hash value generated by the hash function h, as well as the number of bits of x that are used in computing h(x). For example, h(n, x) produces a hash value y of size n bits, wherein only the first n bits of x are used in computing h(x) (the other bits can be masked off). Hence, by varying the size of n, the system can vary the number of possible values of x that must be examined during a brute force search to find x, such that y=h(x). This example works best if the hash function y=h(n, x) produces a one-to-one mapping from the first n bits of x to the first n bits of y. Note that if the hash function is not configurable to generate different sized hash values, the output of the hash function can be adjusted in size by using binary operations to produce a result of size n bits.

Next, the system receives ($id_2$, x) from the client (step 214), wherein $id_2$ is an identifier returned by the client and x is the preimage of y computed by the client. The system then performs a lookup to return the values ($id_1$, n, y) associated with the client (step 216).

Next, the system compares $id_1$ and $id_2$ (step 218). If $id_1$ does not match $id_2$, the system ignores the request for service received from the client. Note that the step of comparing identifiers may inherently be part of the lookup process. For example, if the parameters associated with the client ($id_1$, n, y) are stored in a database that is indexed by $id_1$, a subsequent lookup using $id_2$ will return ($id_1$, n, y) only if $id_1$=$id_2$. Alternatively, if the lookup is based on client identifiers, an explicit comparison of $id_1$ and $id_2$ needs to be performed.

If $id_1$=$id_2$ at step 218, the system computes h(x) (step 220). Next, the system compares y and h(x) (step 222). If y=h(x), the client successfully solved the client puzzle, and the system performs the requested service for the client (step 224).

If y≠h(x), the system ignores subsequent communications from the client distinguished from other clients, as by its source IP address. Alternatively, the system increases the service time for the client (step 226). In one embodiment of the present invention, this is accomplished by doubling the service time for the client every time the client returns an incorrect value x. In this way, the server spends progressively less time servicing requests for the client as the client returns incorrect values of x.

Note that by using the above-described process, the server only computes h(x) if the client returns a matching identifier. This protects against denial-of-service service attacks using messages that appear to originate from non-existent or inactive clients. Also note that storing an n-bit number y typically requires less space (e.g., 40 bits) than storing h(x) (e.g., 128 bits).

Note that the identifier, $id_1$, can be inferred from data related to the communication. For example, given a TCP connection between a client process and a server process, one can identify the connection by using the 5-tuple (TCP, IP src address, IP dst address, IP src port#, IP dst port#). This saves on the work and the storage space involved in creating and storing identifiers.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for protecting a server against denial-of-service attacks, comprising:
   receiving a request for service at the server, wherein the request is received from a client;
   in response to the request, sending a random number, y, and an identifier, $id_1$, to the client;
   allowing the client to compute a preimage, x, such that $y=h(x)$;
   receiving an answer from the client, including the preimage x and an identifier, $id_2$;
   verifying that the identifier, $id_1$, sent to the client matches the identifier, $id_2$, received from the client;
   if the identifiers match, computing $h(x)$; and
   if $h(x)=y$, performing the requested service for the client;
   whereby the server avoids computing $h(x)$ until the server receives the answer with a matching identifier.

2. The method of claim 1, wherein the server sends a parameter, n, along with the random number y to the client, wherein the parameter n varies the amount of computational work involved in computing the preimage x.

3. The method of claim 2, wherein the parameter n specifies that a subset of n bits of $h(x)$ has to match a corresponding subset of n bits of y.

4. The method of claim 1, wherein computing the preimage, x, takes more computational effort than computing $h(x)$, whereby the client is forced to perform more computational work than the server before the server performs the requested service.

5. The method of claim 1, wherein if $y \neq h(x)$, the server ignores subsequent communications from the client.

6. The method of claim 1, wherein if $y \neq h(x)$, the server becomes slower in responding to subsequent communications from the client, distinguished from other clients, as by its source IP address.

7. The method of claim 6, wherein each time the server determines $y \neq h(x)$, the server doubles the service time for the client, distinguished from other clients, as by its source IP address, so that the server spends progressively less time servicing requests for the client.

8. The method of claim 1,
   wherein sending the random number, y, and the identifier, $id_1$, to the client involves first,
      generating the random number y and the identifier $id_1$; and
      storing the random number y and the identifier $id_1$ at the server; and
   wherein verifying that $id_1$ matches $id_2$ involves first looking up $id_1$ and the random number y at the server.

9. The method of claim 1, wherein $h(x)$ is a hash function.

10. The method of claim 1, wherein the identifier, $id_1$, is inferred from data related to the communication.

11. A computer-readable storage medium storing instructions that when executed by a computer cause the computer to perform a method for protecting a server against denial-of-service attacks, the method comprising:
   receiving a request for service at the server, wherein the request is received from a client;
   in response to the request, sending a random number, y, and an identifier, $id_1$, to the client;
   allowing the client to compute a preimage, x, such that $y=h(x)$;
   receiving an answer from the client, including the preimage x and an identifier, $id_2$;
   verifying that the identifier, $id_1$, sent to the client matches the identifier, $id_2$, received from the client;
   if the identifiers match, computing $h(x)$; and
   if $h(x)=y$, performing the requested service for the client;
   whereby the server avoids computing $h(x)$ until the server receives the answer with a matching identifier.

12. The computer-readable storage medium of claim 11, wherein the server sends a parameter, n, along with the random number y to the client, wherein the parameter n varies the amount of computational work involved in computing the preimage x.

13. The computer-readable storage medium of claim 11, wherein the parameter n specifies that a subset of n bits of $h(x)$ has to match a corresponding subset of n bits of y.

14. The computer-readable storage medium of claim 11, wherein computing the preimage, x, takes more computational effort than computing $h(x)$, whereby the client is forced to perform more computational work than the server before the server performs the requested service.

15. The computer-readable storage medium of claim 11, wherein if $y \neq h(x)$, the server ignores subsequent communications from the client.

16. The computer-readable storage medium of claim 11, wherein if $y \neq h(x)$, the server becomes slower in responding to subsequent communications from the client, distinguished from other clients, as by its source IP address.

17. The computer-readable storage medium of claim 16, wherein each time the server determines $y \neq h(x)$, the server doubles the service time for the client, distinguished from other clients, as by its source IP address, so that the server spends progressively less time servicing requests for the client.

18. The computer-readable storage medium of claim 11,
   wherein sending the random number, y, and the identifier, $id_1$, to the client involves first,
      generating the random number y and the identifier $id_1$; and
      storing the random number y and the identifier $id_1$ at the server; and
   wherein verifying that $id_1$ matches $id_2$ involves first looking up $id_1$ and the random number y at the server.

19. The computer-readable storage medium of claim 11, wherein $h(x)$ is a hash function.

20. The computer-readable storage medium of claim 11, wherein the identifier, $id_1$, is inferred from data related to the communication.

21. An apparatus that protects a server against denial-of-service attacks, comprising:
   the server;
   a receiving mechanism within the server that is configured to receive a request for service from a client;
   an access mechanism, wherein in response to the request, the access mechanism is configured to,
      send a random number, y, and an identifier, $id_1$, to the client,
      allow the client to compute a preimage, x, such that $y=h(x)$,
      receive an answer from the client, including the preimage x and an identifier, $id_2$, and to
      verify that the identifier, $id_1$, sent to the client matches the identifier, $id_2$, received from the client,
   wherein if the identifiers match, the access mechanism is configured to compute $h(x)$; and wherein if h(x)=y, the server is configured to perform the requested service for the client;

whereby the server avoids computing h(x) until the server receives the answer with a matching identifier.

22. The apparatus of claim 21, wherein the access mechanism is configured to send a parameter, n, along with the random number y to the client, wherein the parameter n varies the amount of computational work involved in computing the preimage x.

23. The apparatus of claim 22, wherein the parameter n specifies that a subset of n bits of h(x) has to match a corresponding subset of n bits of y.

24. The apparatus of claim 21, wherein computing the preimage, x, takes more computational effort than computing h(x), whereby the client is forced to perform more computational work than the server before the server performs the requested service.

25. The apparatus of claim 21, wherein if y≠h(x), the server is configured to ignore subsequent communications from the client.

26. The apparatus of claim 21, wherein if y≠h(x), the server is configured to become slower in responding to subsequent communications from the client, distinguished from other clients, as by its source IP address.

27. The apparatus of claim 26, wherein each time the server determines y≠h(x), the server is configured to double the service time for the client, distinguished from other clients, as by its source IP address, so that the server spends progressively less time servicing requests for the client.

28. The apparatus of claim 21, wherein the access mechanism is additionally configured to:

generate the random number y and the identifier $id_1$;

store the random number y and the identifier $id_1$ at the server; and upon receiving the answer from the client, to look up $id_1$ and the random number y at the server.

29. The apparatus of claim 21, wherein h(x) is a hash function.

30. The apparatus of claim 21, wherein the identifier, $id_1$, is inferred from data related to the communication.

* * * * *